United States Patent
Hascoet et al.

(10) Patent No.: US 9,962,799 B2
(45) Date of Patent: May 8, 2018

(54) METHOD AND MACHINING DEVICE BY COMBINED ADDITION OF MATERIAL AND SHAPING

(71) Applicants: ECOLE CENTRALE DE NANTES, Nantes (FR); CENTRE NATIONAL DE LA RECHERCHE SCIENTIFIQUE (C.N.R.S.), Paris (FR)

(72) Inventors: Jean-Yves Hascoet, Nantes (FR); Gilles Carabin, Germain St Moine (FR); Pascal Mognol, Rennes (FR)

(73) Assignee: ECOLE CENTRALE DE NANTES, Nantes (FR)

( * ) Notice: Subject to any disclaimer, the term of this patent is extended or adjusted under 35 U.S.C. 154(b) by 362 days.

(21) Appl. No.: 14/362,091

(22) PCT Filed: Dec. 3, 2012

(86) PCT No.: PCT/EP2012/074268
§ 371 (c)(1),
(2) Date: May 30, 2014

(87) PCT Pub. No.: WO2013/079725
PCT Pub. Date: Jun. 6, 2013

(65) Prior Publication Data
US 2015/0000108 A1    Jan. 1, 2015

(30) Foreign Application Priority Data
Dec. 2, 2011 (FR) ...................... 11 61126

(51) Int. Cl.
*B23K 26/32* (2014.01)
*B23K 26/00* (2014.01)
(Continued)

(52) U.S. Cl.
CPC .............. *B23P 23/04* (2013.01); *B21D 22/16* (2013.01); *B23K 26/0093* (2013.01);
(Continued)

(58) Field of Classification Search
CPC ........... B23P 23/04; B23P 17/00; B23P 15/00; B23K 26/32; B23K 37/047;
(Continued)

(56) References Cited

U.S. PATENT DOCUMENTS 3,342,051 A    9/1967    Leszak
4,698,480 A  * 10/1987   Klingel ................. B21D 28/12
                                                219/121.39
(Continued)

FOREIGN PATENT DOCUMENTS

DE    19533960 A1    3/1997
EP    0529816 A1     3/1993
(Continued)

OTHER PUBLICATIONS

Franzen et al, "Rapid prototyping in der Blechumformung," Apr. 1, 2009, pp. 67-69, vol. 151, No. 4, Springer VDI Verlag, Germany.

*Primary Examiner* — Ryan J Walters
*Assistant Examiner* — Lawrence Averick
(74) *Attorney, Agent, or Firm* — Im IP Law; C. Andrew Im

(57) ABSTRACT

A machining method and apparatus for machining a part comprises a machining head and motorized axes comprising a rotary axis for displacing the machining head in a working space. Apparatus comprises a mechanism for positioning a part and holding it in position the working space. The machining head comprises a support for supporting a material shaping tool and a supply device for supplying material.

15 Claims, 5 Drawing Sheets

(51) Int. Cl.
| | |
|---|---|
| *B23K 26/08* | (2014.01) |
| *B23P 23/04* | (2006.01) |
| *B23P 15/00* | (2006.01) |
| *B23P 17/00* | (2006.01) |
| *B23K 26/34* | (2014.01) |
| *B21D 22/16* | (2006.01) |
| *B23Q 39/02* | (2006.01) |
| *B23K 37/04* | (2006.01) |
| *B23K 37/047* | (2006.01) |
| *G05B 19/4099* | (2006.01) |
| *B23K 103/16* | (2006.01) |

(52) U.S. Cl.
CPC ........ *B23K 26/083* (2013.01); *B23K 26/0884* (2013.01); *B23K 26/32* (2013.01); *B23K 26/34* (2013.01); *B23K 37/047* (2013.01); *B23K 37/0408* (2013.01); *B23P 15/00* (2013.01); *B23P 17/00* (2013.01); *B23Q 39/024* (2013.01); *G05B 19/4099* (2013.01); *B23K 2203/16* (2013.01); *B23K 2203/172* (2015.10); *G05B 2219/49018* (2013.01); *G05B 2219/49328* (2013.01); *G05B 2219/49358* (2013.01); *Y10T 29/49982* (2015.01); *Y10T 29/5176* (2015.01)

(58) Field of Classification Search
CPC ............ B23K 26/0093; B23K 26/0884; B23K 37/0408; B23K 26/083; B23K 26/34; B23K 2203/16; G05B 19/4099; G05B 2219/49328; G05B 2219/49358; G05B 2219/49018; B21D 22/16; B23Q 39/024; B33Y 30/00
See application file for complete search history.

(56) References Cited

U.S. PATENT DOCUMENTS

| | | | | | |
|---|---|---|---|---|---|
| 5,121,329 | A | * | 6/1992 | Crump | B22F 3/115 228/180.5 |
| 5,160,824 | A | * | 11/1992 | Babel | B23K 26/0093 219/121.68 |
| 5,207,371 | A | * | 5/1993 | Prinz | B22F 3/008 164/46 |
| 5,303,141 | A | * | 4/1994 | Batchelder | B29C 41/36 156/244.11 |
| 5,340,433 | A | * | 8/1994 | Crump | B22F 3/115 118/202 |
| 5,426,964 | A | * | 6/1995 | Sieger | B21D 22/18 72/81 |
| 5,503,785 | A | * | 4/1996 | Crump | B29C 67/0055 264/308 |
| 6,144,008 | A | | 11/2000 | Rabinovich | |
| 6,441,338 | B1 | * | 8/2002 | Rabinovich | B21D 37/205 219/121.64 |
| 8,999,222 | B2 | * | 4/2015 | Abe | B29C 33/3842 264/328.16 |
| 2007/0003416 | A1 | * | 1/2007 | Bewlay | B22F 5/009 416/241 B |
| 2007/0183918 | A1 | * | 8/2007 | Monsheimer | B29C 67/0077 419/1 |
| 2009/0020901 | A1 | * | 1/2009 | Schillen | B29C 67/0051 264/31 |
| 2009/0226272 | A1 | | 9/2009 | Smith et al. | |
| 2010/0191360 | A1 | * | 7/2010 | Napadensky | B29C 67/0059 700/98 |
| 2011/0208304 | A1 | * | 8/2011 | Justin | A61F 2/30767 623/11.11 |
| 2012/0116568 | A1 | * | 5/2012 | Murphy | B41J 3/407 700/118 |
| 2013/0073068 | A1 | * | 3/2013 | Napadensky | B29C 67/0059 700/98 |
| 2013/0292862 | A1 | * | 11/2013 | Joyce | B29C 67/0066 264/40.1 |
| 2014/0328964 | A1 | * | 11/2014 | Mark | B29C 67/0088 425/166 |

FOREIGN PATENT DOCUMENTS

| | | |
|---|---|---|
| EP | 0574580 A1 | 12/1993 |
| EP | 1614497 A1 | 1/2006 |
| GB | 2472685 A | 2/2011 |
| JP | 2010280173 A | 12/2010 |
| WO | 2009050229 A1 | 4/2009 |

\* cited by examiner

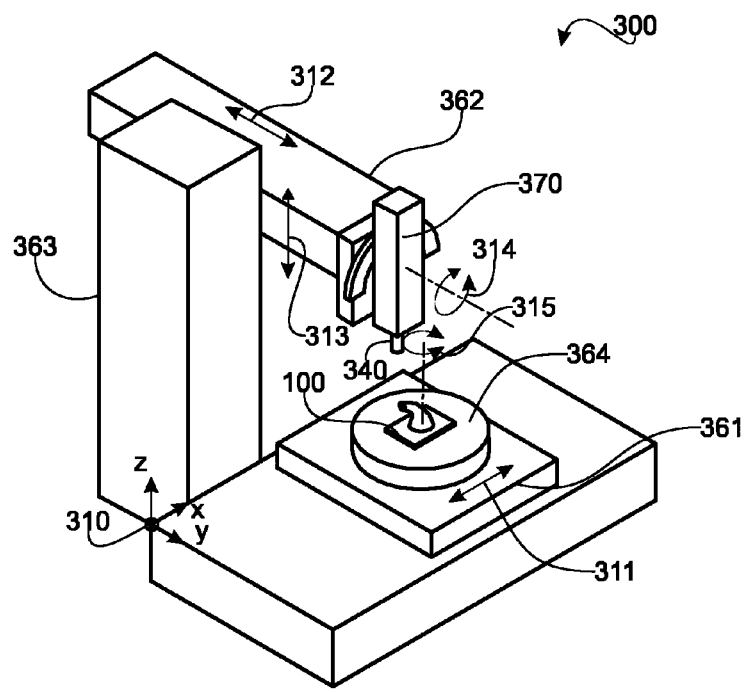
Fig. 3
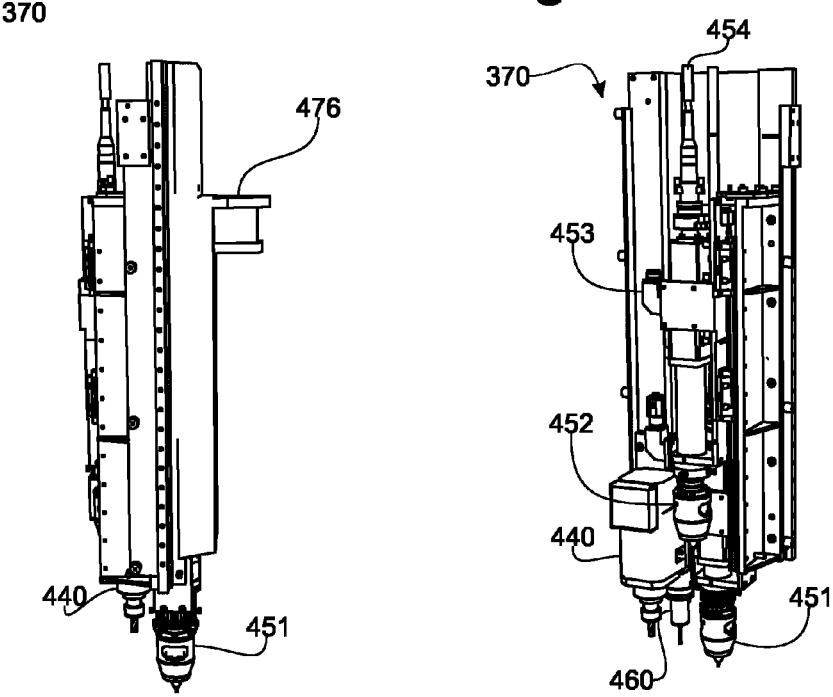
Fig. 4          Fig. 5

METHOD AND MACHINING DEVICE BY COMBINED ADDITION OF MATERIAL AND SHAPING

RELATED APPLICATIONS

This application is a § 371 application from PCT/EP2012/074268 filed Dec. 3, 2012, which claims priority from French Patent Application No. 1161126 filed Dec. 2, 2011, each of which is herein incorporated by reference in its entirety.

TECHNICAL FIELD OF THE INVENTION

The invention relates to a method and device for machining by combined addition of material and shaping. The method and device according to the invention are more particularly suitable for making parts where the three-dimensional shape or the micro-geometric quality of the surfaces cannot be achieved using methods of machining by addition of material and shaping applied separately. In what follows, a method is considered to be applied separately from another when the part being made is repositioned in the machine space, whether such repositioning is achieved by changing the machine or by transferring the part from one zone of a transfer machine to another zone of that transfer machine, wherein the part is kept on its mount or machining pallet, or when the part is left mounted on the same machine and the configuration of said machine is significantly changed so that the point of origin of the axes or the dynamic behavior of the machine are thereby modified, for example by changing the machining head or if the movement compensation tables saved in the numerical control system of the machine are modified or no longer reflect the behavior of the machine if they are kept in the same configuration. In the remainder of the document, the term 'machining phase' thus designates a succession of machining operations carried out on the same part, without changing the machining station of the part and without modifying the configuration of the machining station or the positioning of the part.

In the entire document, the term 'machining' applies to the act of machining and the verb 'to machine' is understood in the general meaning of working a material or a part on a machine tool.

BACKGROUND OF THE INVENTION

Machining methods, both by adding and removing material, are known in the prior art. The Japanese patent application JP-A-2 010 2 801 73 describes a device and method comprising a combination, on the same machine, of an additive machining method and a machining method using the removal of material. In that prior art, the implementation of the method uses two distinct machining devices mounted on the same frame but using different movement axes. Thus, in the prior art, a first series of effectors is used to deposit a bed of powder and sinter part of that bed of powder by means of a laser beam whose trajectory in said bed is determined by the movements of a mirror, and a second series of effectors comprises a milling spindle, the movements of which are controlled by numerically controlled axes distinct from the axes that control the movements of the mirror. These are in fact two distinct machines sharing the same frame. Besides, the method for the removal of material according to that prior art is aimed at favoring the conditions of implementing the additive machining method by retouching the surface of deposited material so as to correct the geometry of the surface and clean it of all pollution in order to favor the bonding of the layer of material deposited during the following operation. Thus, the prior art is primarily aimed at ensuring the soundness of the material of the part made by additive machining, with no particular objective in respect of the precision of the combined machining operations, which precision cannot be achieved due to the change in phase between the operation of adding and that of removing material.

OBJECT AND SUMMARY OF THE INVENTION

The invention is aimed, particularly but not exclusively, at making a part with a complex shape such as that represented in FIG. 1. In that example, which is not limitative in any way and is only intended to illustrate the technical problem solved by the invention, the part (100) to be made comprises a flat rigid plate (110), making up the substrate, comprising a bore (115) at its center and a hollow prolongation (120) with a complex conical shape centered on said bore (115), which may be obtained by adding material. The totality of said part (100) is made with constraints relating to the surface condition, both on the outside and on the inside of the prolongation with a complex shape (120), for example roughness Ra of 1.6 µm ($10^{-6}$ meters) according to standard ISO 4287. Besides, said part may also be made with geometric constraints such as concentricity tolerance between the bore (115) of the plate and that of the conical prolongation (120) at the said plate, and tolerance for the thickness (e) of the walls of the prolongation (120). For example, these tolerances are 0.05 mm. According to the known methods of the prior art, such a part (100), with such achievement constraints cannot be made by positioning only once; as a result, obtaining the required precision is delicate and not compatible with mass manufacturing.

In what follows, the term 'substrate' refers to the initial material of the part on which the material is deposited by means of a method using machining by addition, wherein the material so deposited can be of the same type or of a different type from the material of the substrate.

The making of the part (100) represented in FIG. 1 by positioning only once requires the use of a rotary motion and even two rotary motions, both for additive machining operations and for machining operations involving the removal of material or ablative machining. Typically, such a part must be made on a machine with at least five relative movement axes between the part and the tool, which five axes comprise, for instance, three orthogonal displacements and two rotations along orthogonal axes. To make such a part, the five axes must be used continuously, that is to say the machining tool must be continuously directed in relation to the machined surface. Five-axis machine architectures are varied and are known in the prior art. To allow the machining programs to be portable to a certain extent between different machine configurations, programming is carried out by describing the movement of the end of the active part of the tool, according to a known and commonly used method. For implementing the program on the machine, each tool is associated with 'gages' that is to say a file with numerical values that define the position of the active part of said tool in the machine reference when the tool is fitted in the spindle of said machine. The gage file is integrated into the kinematic working tables saved in the memory of the control system of the machine, wherein said working tables translate the programmed displacement orders in terms of the displacement of motorized axes, so as to obtain the required trajectory. Thus, particularly when the architecture of the machine is of the parallel type, simple movement such as displacement leads to the mobilization of 5 motorized axes or even more depending on the architecture.

To achieve the required machining precision, particularly at a high feed speed, numerically controlled machining machines using the state of the art have compensation tables. These tables make it possible to correct machine errors, particularly mechanical errors. Such errors can have a variety of origins: manufacturing fault, rigidity variation, deformation, thermal dilatation etc. Thus, all numerically controlled machines have a working volume in which their precision and performance are optimal; their performance drops outside that volume. Following a trajectory with a tool where the gages make it necessary to move out of that optimal operating volume or where the mass added to the structure modifies its dynamic behavior makes the machine operate in adverse conditions or conditions that make it necessary to reload new compensation tables, which amounts to using another machine and changing the machining phase.

The document EP 1 614 497 describes a device and method for machining that combine additive machining and ablative machining using the same machine. The change from one machining mode to another is made by mounting an additive machining device at the end of the machining head or directly in the spindle of the machine. That additive machining device comprises a melting means, a device to supply material and a blowing means. Thus, the mounting of that additive machining device on the head of the machine significantly modifies the mass in movement, and the behavior of the machine during additive machining differs from the behavior of the same machine during ablative machining.

The document EP 0 529 816 describes a device and method for machining that combine additive machining and ablative machining. The additive machining device is mounted permanently near the ablative machining spindle so that the machine mass is substantially the same in both machining configurations. That document teaches the addition of the additive machining device on an existing machine for machining by removing material. Thus, in order to retain the automatic tool change capacity and avoid interference between the device and the part during ablative machining operations, the additive machining device is placed away from the machine spindle. Thus, when additive machining is used, the machine works in a volume at the boundaries or even outside its optimal working volume. The effect of that is moderate when the machine has a serial architecture and only comprises three orthogonal linear movement axes as described in the document. Further, the document teaches the additive machining of a preform, that is to say a block of material that forms a manner of a blank. Precision is obtained by ablative machining, so that the precision required for additive machining is lower by several orders of magnitude to the precision of the machine. The technical solution taught in the document is not applicable to cases where one of the machining operations, additive or ablative, requires movement with the continuous control of the direction of the tool in relation to the surface made.

The invention aims to remedy the drawbacks of the prior art and therefore relates to a device for machining a part, said device comprising:
a. a machining head and motorized axes comprising a rotary axis for displacing said head in a space, known as the working space;
b. means for positioning a part and holding it in position in said working space;
c. such that the machining head comprises means for supporting a material shaping tool and means capable of supplying material.

Thus the device according to the invention makes it possible to go from machining by addition to machining by shaping and vice versa using the same machining head, moved by the same means. The mass of the structure remains the same when the machining operation is changed.

The invention also relates to a method implemented by means of the previous device, which method comprises the steps of:
i. depositing a layer of material on a part using supply means during an adding operation;
ii. shaping part of the part by means of the shaping tool during a shaping operation;
iii. the adding and shaping operations are carried out in the same phase along trajectories that extend in the three dimensions of the space and the supply means and shaping tool are directed normally in relation to those trajectories.

Thus, the parts of the part that are machined during the adding and shaping operations are perfectly positioned in relation to each other, because they are made in the same phase, that is to say with no change in the positioning of the part and without changing the configuration of the machining station. The normal direction of the machining head in relation to the trajectories makes it possible to limit the quantity of material deposited to what is strictly necessary and to improve the surface quality of the parts made.

The invention can be implemented in the advantageous embodiments described below, which may be considered individually or in any technically operative combination.

Advantageously, the device according to the invention comprises:
d. sensing means placed on the machining head;
e. means for measuring, on the motorized axes, the position of said sensing means in the machine space.

Thus, in addition to the precision intrinsic to the machine for joining up the two machining operations, the sensing means make it possible to perfectly join up the two successive machining operations and compensate for shifts, particularly due to thermal dilatation of the part.

Advantageously, the shaping tool is a cutting tool. Thus, both the substrate and the material deposited on the part can be machined by removing material, so as to calibrate their dimension or obtain definite surface conditions.

In one embodiment of the device according to the invention, the device comprises:
f. means for transmitting a cutting motion to the cutting tool.

Thus, the device according to the invention is adapted to the completion of material removal operations by milling or abrasion, particularly with a grinding wheel.

In another embodiment of the device according to the invention, compatible with the previous embodiment, the device comprises:
g. means for transmitting a cutting motion to the part.

Thus, the device according to the invention is suited to the performance of machining by turning or polishing operations on revolving parts where symmetry in revolution is obtained by the cutting motion.

Advantageously, the shaping tool of the device according to the invention is a tool for forming the material by plastic deformation. Thus, the device according to the invention makes it possible to implement shaping operations, both for shaping and for straightening the substrate or the deposited material. This embodiment is besides compatible with the previous ones.

Advantageously, the means for supplying material of the device according to the invention comprise:
- ci. a nozzle comprising an orifice for spraying metal powder;
- cii. a device for generating a laser beam coaxial with the orifice of the nozzle and capable of melting the powder as it is sprayed.

Thus, the depositing of material is controlled along precise trajectories, as the point of addition of material is perfectly defined in the space of the machine.

Advantageously, in the method according to the invention, an adding operation and a shaping operation are carried out successively with a mass of the machining head that is substantially constant. Thus, the two operations optimally use the compensation tables of the machine.

Advantageously, additive machining and shaping machining using the method according to the invention are carried out along a trajectory that extends in the three dimensions of the space and the axis of the spray of melted powder or the shaping tool is directed normally in relation to that trajectory.

Advantageously, the shaping operation using the method according to the invention is a contour cutting operation carried out on a layer of material deposited during an earlier adding operation. Thus, the layer of deposited material can be calibrated in terms of contour and thickness.

Advantageously, the layer deposited during the adding operation is added on a surface that has first undergone shaping. Thus, in addition to the fact that the bonding of the layer deposited on said surface is favored, the combination of the two methods makes it possible to optimize the contribution of each to the making of the desired shape.

In one advantageous embodiment of the method according to the invention, the method comprises a step of:
- iv. carrying out a part sensing operation before a shaping or adding operation, in order to readjust said operation in the machine space.

Thus, the parts are made with greater precision, and any geometric differences can be corrected. The term 'sensing' must be understood here in the wider sense and also includes contactless measurement methods or devices fitted in the machining head.

Advantageously, the shaping operation is an incremental forming operation. Thus the device according to the invention makes it possible to obtain complex shapes starting with a metal sheet.

In one particular embodiment of the method according to the invention, the substrate and the material deposited during the adding operation are of different types. Thus, the operation of machining by addition allows, over and above the making of the shape, the achievement of particular characteristics, particularly the hardness or corrosion resistance of the deposited layer of material, and therefore that of the part made.

In one advantageous embodiment of the method according to the invention, the prior shaping of the surface on which the material is deposited is an incremental forming operation. Thus, the substrate can be selected from materials that are highly formable, where the usage characteristics can be improved by depositing material.

In this last advantageous embodiment of the method according to the invention, the invention comprises, at the end of the operation of adding material on the surface that has first been shaped by incremental forming, a step of:

- v. carrying out a cutting operation on the layer of material deposited on the surface shaped previously.

Thus, in addition to an improved surface quality, this operation makes it possible to shape fine details that are unachievable either by the shaping method or by the adding method.

Advantageously, the implementation of the method according to the invention uses a device comprising a head for machining by adding material that uses a laser beam, and said method comprises the steps of:
- vi. placing an added piece on the part made in steps (i) to (iii) of the method according to the invention;
- vii. welding said added piece to the part using the laser beam of the machining head.

Thus, the method can be used for making parts comprising surfaces included between the substrate and the added piece.

Thus, the invention also relates to a composite part, called a 'sandwich' part, obtained by the method according to the invention in that last embodiment, which part comprises:
- x. a first machined substrate;
- y. stiffeners that extend raised from the first substrate, where said stiffeners are deposited on the substrate by means of a method according to one of the embodiments of the invention;
- z. a second substrate placed on top of said stiffeners and fixed to them by welding.

Thus, by combining the different embodiments of the method according to the invention, complex sandwich parts, such as honeycomb parts, can be created. For example, the two substrates may be shaped differently and not parallel or the density of the stiffeners may be variable over the surface of the part.

Advantageously, the first substrate, the stiffeners and the second substrate are made of different materials.

BRIEF DESCRIPTION OF THE DRAWINGS

The invention is described below in its preferred embodiments, which are not limitative in any way, and by reference to FIGS. 1 to 10, wherein:

FIG. 3 is a perspective view of an example of the architecture of a numerically controlled machine adapted for implementing the invention;

FIG. 4 is a profile view with the casing open of an exemplary embodiment of a machining head according to the invention;

FIG. 5 is a front perspective view of an exemplary embodiment of a machining head according to the invention;

DETAILED DESCRIPTION OF THE EMBODIMENTS

Figure 1:
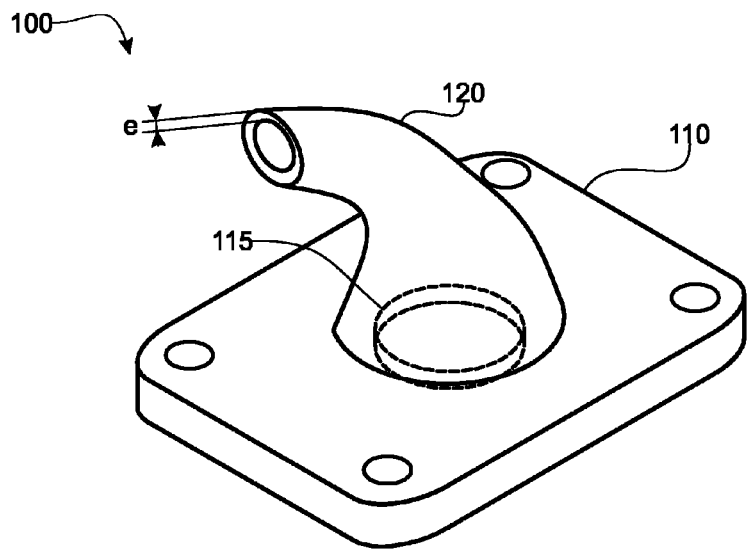
FIG. 1 is a perspective view of an example of a part to be made using the method according to the invention.
Figure 2:
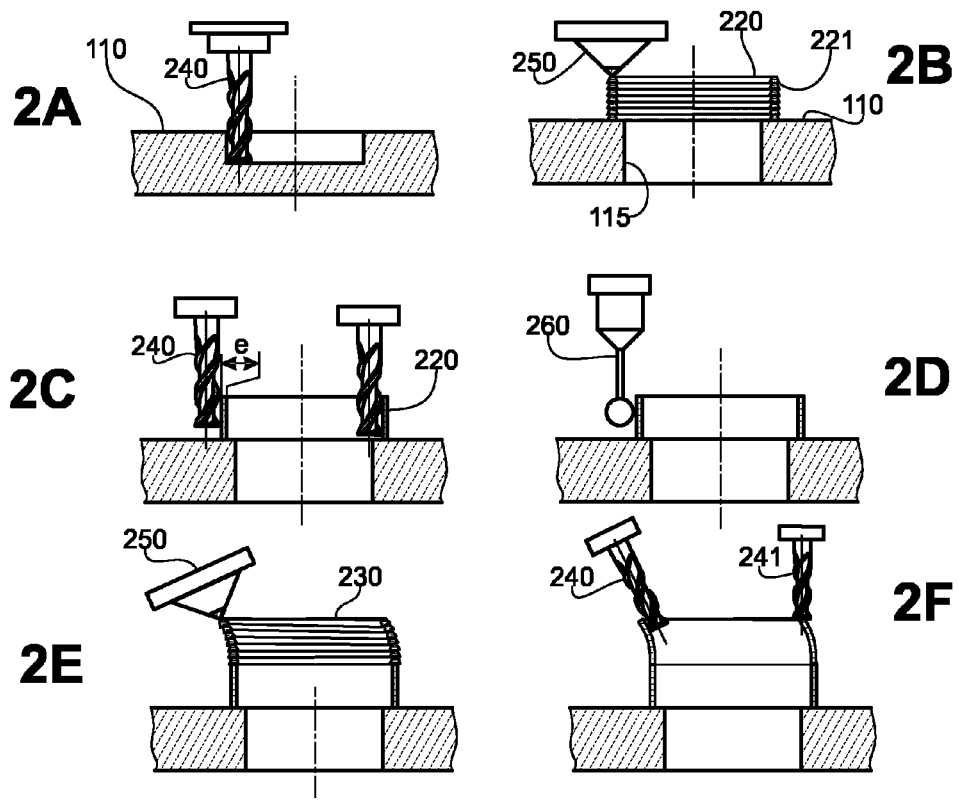
FIG. 2 is a partial sectional front view of the succession of first operations corresponding to the start of the making of the part in FIG. 1 using the method and the device according to the invention.

In FIG. 2A of an exemplary embodiment of the method according to the invention, corresponding to the first operations for making the part (100) of FIG. 1; said method comprises a first contour milling machining step for making the bore (115) in the plate (110). To that end, said plate (110) is positioned in the machine space and a shaping tool, in this case a milling cutter (240) is selected.

In FIG. 2B, the bore is made and means (250) for machining by adding material are selected in order to make a first part (220) of the shape (120). In the method according to the invention, that operation is carried out without changing the head of the machine and without modifying the positioning of the plate (110) so that the deposited material (220) and the bore (115) made earlier are perfectly located in relation to each other, because the precision of positioning only depends on the precision of the tracking of the trajectories of the machine. In one exemplary embodiment, the machining method by addition of material is a method of spraying melted powder, wherein such powder is melted by a laser beam. Such a method has been described, for example, in the document EP-B-0 574 580. It makes it possible to machine by adding material with no binder. Thus, the deposited material has mechanical properties close to those of the same material when implemented by a casting method. The depositing of successive layers leads to rises, or steps (221) on the surfaces made in that way.

In FIG. 2C, in an exemplary embodiment of the method according to the invention, the part (220) machined by adding material in the previous operation is reworked by contour milling so as to calibrate its thickness (e), eliminate the rises and achieve the required surface condition quality. Thus, in this embodiment, the parameters of the operation of machining by addition are optimized to obtain the best quality of deposited material allowed by the method, with no constraint relating to the exact geometry of the deposited material (220), which is reworked during the following contour milling operation. The machine is not reconfigured between two operations and the positioning of the part is not modified, so the position in the machine space of the part of added material (220) is perfectly known. The contour milling operation is thus carried out without readjusting the axes. The precision with which this contour milling operation is carried out thus only depends on the precision of the tracking of the machine trajectories.

Indeed, in FIG. 3 of an exemplary embodiment, the device according to the invention comprises a machine (300) that comprises a machining head (370) supporting an effector (340). In the invention, said effector comprises a shaping tool or a nozzle for machining by addition, wherein the additive and shaping machining means are always present jointly in the machining head so that the mass of said machining head is substantially constant, within the range of the weight of the shaping tool. Said machining head (370) is moved in the working space of the machine by motorized axes controlled by a numerical control system. In this embodiment, which is not limitative in any way, the machine (300) comprises three perpendicular displacement axes:
a horizontal axis (311), called the X axis, corresponding to the displacement of the table (361) of the machine;
a horizontal axis (312), called the Y axis, perpendicular to the previous one (311) carried by the ram (362) supporting the machining head (370);
a vertical axis (313), called the Z axis, perpendicular to the other two, transmitted to the ram (362) guided on a column (363).

These three axes corresponding to displacement movements are in this exemplary embodiment associated with two rotary displacement axes:
one rotary motion (314) around the Y axis, called the B axis, applied to the machining head (370);
one rotary motion (315) around the Z axis, called the C axis, carried by a platen (364), itself connected to the table (361).

All these axes are controlled by a numerical control system (not shown), which measures the position of each axis by means of an appropriate sensor, so that the position of each axis is known in a reference (310) connected to the machine. The positioning of the part (100) in the machine consists in determining the position and direction of said part, that is to say its surfaces, in the references (310) of the machine. This embodiment of the machine with an architecture known as a serial architecture is not exclusive, and in other advantageous embodiments, the machine comprises motorized axes configured in a parallel architecture. In all cases, the machining device according to the invention comprises a sufficient number of displacement axes so that both the shaping tool and the additive machining tool can be directed continuously, along the normal relative to a trajectory extending in three dimensions in the working space.

With the usual and known characteristics of the prior art, the numerical control system comprises numerical tables that make it possible, firstly, to change the geometric information received from axis position and displacement sensors in the reference of the machine, into a position and direction of the tool or generally the effector mounted in the machining head, and secondly, tables, known as compensation tables, which make it possible to compensate for machine deformations, movement inaccuracies or even thermal dilatation in order to ensure a match between the actual trajectory and the programmed trajectory of the effector (370) in spite of these sources of dispersion.

Thus, putting the part (100) into position, putting it back into position or changing its position in the machine space leads to uncertainty of positioning and direction of said part in said space, which uncertainty depends on the precision of the means for measuring that position and the ability to translate that positioning status into the control of the axes of the machine. The problem is felt all the more acutely when the surfaces to reposition in the machine space are surfaces with complex shapes.

Similarly, a change in the machining head (370) or the use of other displacement axes, as in the prior art, to move from one type of effector to another, leads firstly to the inaccurate positioning of the new head on the machine, particularly due to the need to load new numerical tables for geometric transformation and compensation. Such an operation cannot be carried out in the same machining program. Thus, changing the head on a numerically controlled machine amounts to changing the machine, and even if the part remains in position on the machine during the change of head, its effective position and its direction in the machine reference are modified with regard to trajectories. Thus, the device according to the invention, by avoiding both a change in the machine configuration and the repositioning of the part, allows for the cost-effective and quick achievement of precise dimensions, such as the thickness dimension (e) of FIG. 2C.

In FIG. 2D, particularly in the case of a hot additive machining method such as the spraying of powder that is melted by means of a laser beam, the shape of the part is liable to be modified between two material addition operations, merely because of the thermal dilatation of said part (100). The device according to the invention advantageously comprises sensing means (260) that make it possible to measure the precise shape of the part and then to readjust the additive machining or shaping machining trajectories.

In FIG. 2E, in an exemplary embodiment of the method according to the invention, the geometric information obtained from the sensing operation is used to deposit a second section (230) precisely on the first one (220) by selecting the additive machining means (250) once again. In this exemplary embodiment, the use of a machine (300) with five displacement axes makes it possible to direct the additive machining means (250) to make complex shapes.

In FIG. 2F, the section (230) deposited during the previous additive machining operation is finished on its inner and outer sides by material removing machining means (240) so as to calibrate the shape, thickness and surface condition of the section (230). In a particular embodiment, that finishing operation comprises reworking, with an appropriate tool (241), the top of the section (230) deposited during the previous addition operation, so as to form its shape in order to optimize the bonding of the layer of material deposited during the next addition machining operation. For each of these ablative machining operations, the tool (240, 241) is advantageously directed substantially normal in relation to the trajectory followed by its active end in the working space. The term 'substantially normal' takes account of local directions in relation to the normal direction aimed at avoiding over-cutting or interference.

The previous sequences of FIGS. 2D to 2F are repeated till the finished part is made. The alternate performance of material removal and addition machining operations allows the making of complete and entirely finished shapes that would be absolutely impossible with the help of other shaping technologies.

Even though the operations for machining by material removal in these exemplary embodiments are presented in the form of contour milling and end milling, the method according to the invention is suitable for all types of machining by material removal, particularly abrasion machining operations such as polishing or grinding.

In FIG. 4 of an exemplary embodiment, the machining head (370) of the device according to the invention is represented without its casing and continuously comprises effectors of at least two types:
  an additive machining nozzle (451) that sprays and coaxially melts powder; and
  a milling spindle (440) for material removal machining.

A fastening interface (476) makes it possible to connect said machining head to the ram of the machine tool.

In FIG. 5 of an advantageous embodiment of the device according to the invention, the machining head (370) continuously comprises four effectors, namely:
  a sensing device (460); and
  a second additive machining nozzle (452);
in addition to the first additive machining nozzle (451) and the milling spindle (440).

In this exemplary embodiment, each additive machining device or nozzle (451, 452) comprises means (453) for supplying material in powder form and a fluid known as containment fluid, for injecting said materials in the nozzle. Each nozzle is also connected to means (454) for bringing a laser beam capable of melting the powder injected in this way.

In one exemplary embodiment, the laser used is a diode laser with a power rating of approximately 4000 Watt. This type of laser is adapted, firstly, for additive machining operations when it is combined with means to eject powder material and secondly it is also adapted for welding operations when it is used alone.

Figure 6:
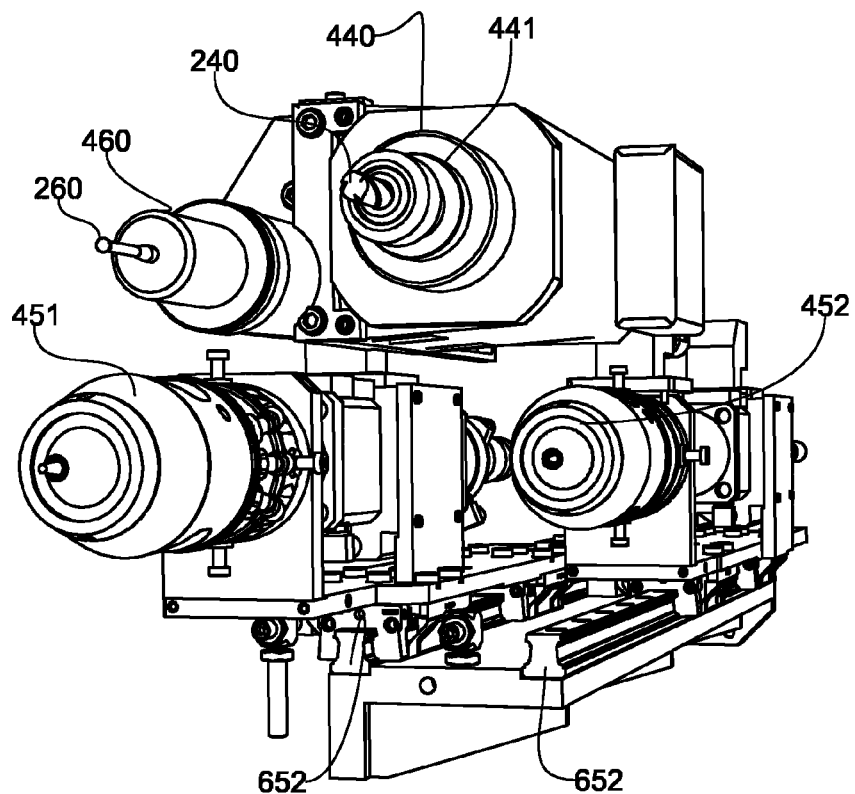
FIG. 6 is a perspective view at the end of the machining head of FIG. 5, without its casing.

In FIG. 6, additive machining nozzles (451, 452) are fitted in the machining head on guides (651, 652). Thus, said nozzles are retracted into the machining head during shaping operations to avoid the risk of collision between said nozzles and the part or machine components. The use of two additive machining nozzles (451, 452) makes it possible to modify the nature of the material deposited during the same machining phase or use different output rates of deposited material, depending on the quantity of material to deposit and the fineness of the details to create.

In this exemplary embodiment, the shaping tools are mounted in the spindle (440) through a standardized attachment (441) that provides for automatic tool changes. As a non-limitative example, the attachment is selected from the HSK series according to standard ISO 12164-1 in a dimension adapted to the power rating of the spindle and its rotation speed. In a known configuration of the prior art, such attachments have microchips comprising geometric information about the tools, wherein the spindle is equipped with a reader capable of reading the information automatically during each tool change and thus integrating it into the calculation of trajectories. Thus, the machine implementing the method according to the invention is advantageously equipped with an automatic tool changer. The nozzles (451, 452) are then retracted at each tool change.

The spindle is advantageously adapted for machining by removing material at a high cutting speed. Thus, the surfaces of the part are finished with reduced cutting force, in order to limit deformations of both the machine and the part during these operations.

All the effectors (451, 452, 440, 460) are always present in the machining head so that the different machining operations implemented by the method according to the invention are carried out with a machine mass that is substantially constant, within the range of the weight of the shaping tool.

In the previous exemplary embodiments, the operations for shaping by removing material are carried out by milling, by transmitting a cutting motion to the tool.

Figure 7:
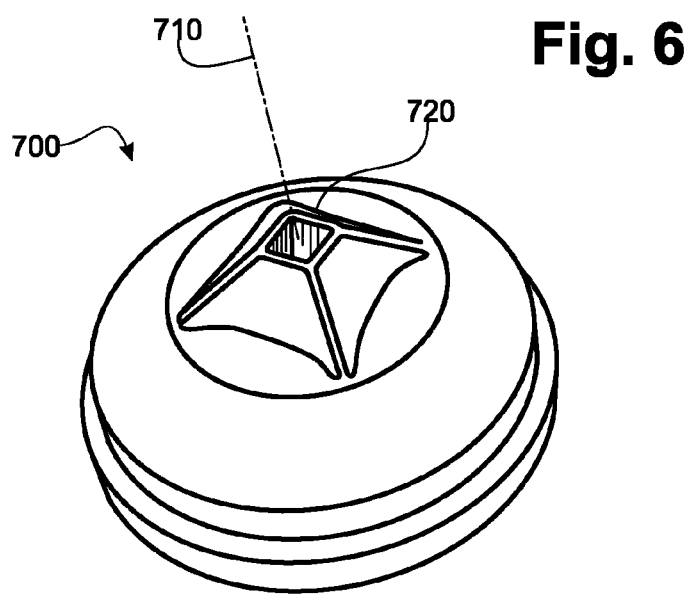
FIG. 7 is a top perspective view of an example of a part comprising a substrate showing revolution symmetry.

In FIG. 7, in one exemplary embodiment suitable for making a part (700) with surfaces that are symmetrical in respect of revolution around an axis (710), said part is advantageously made by mean of a shaping method using turning, by giving the part a rotary motion around the axis (710) of symmetry of the part.

To that end, returning to FIG. 3, the platen (364) of the machine on which the part is fixed is, in a particular exemplary embodiment, coupled with motorizing means capable of transmitting to said platen (364) an appropriate cutting motion. Alternatively, the part is fitted in the indexed mandrel of a horizontal or vertical turning center.

Going back to FIG. 7, the part (700) further comprises a part (720) made by additive machining. In alternative embodiments, the part is hollow and may or may not be symmetrical in relation to revolution.

Figure 8:
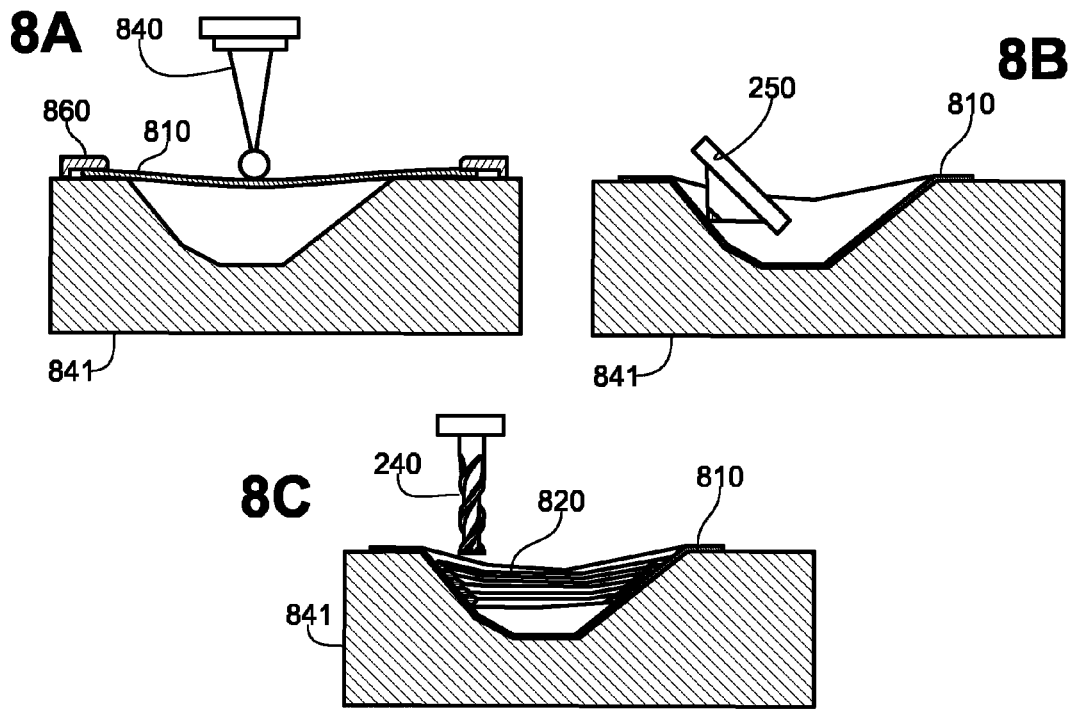
FIG. 8 is an example of the succession of the operations of a method according to the invention comprising an incremental shaping operation.

In FIG. 8, in an exemplary embodiment of the method according to the invention, the method uses a sheet substrate (810), which substrate undergoes a first shaping operation using incremental forming in FIG. 8A. Incremental forming is a shaping method using the plastic deformation described, for instance, in the document U.S. Pat. No. 3,342,051, and consists in locally drawing a blank using a tool that follows trajectories.

In FIG. 8A, the metal sheet (810) is held on its edges by a blank holder (860) on a die (841). Shaping is carried out by an incremental forming tool (840) fitted in the head of the machine, for example in the machining spindle.

In FIG. 8B, after shaping, the blank (810) follows the shape of the die (841). The additive machining device (250) is then used, for instance, to compensate for local losses of thickness of the blank resulting from drawing. The method according to the invention makes it possible to select the metal that makes up the blank (810) for its formability characteristics; the additive machining method is then advantageously used to deposit coating on said blank to give it other characteristics such as surface hardness or resistance to oxidation, which may be incompatible with the formability characteristics of the initial blank. In one embodiment, the additive machining operation is used to create shapes that cannot be achieved by incremental forming. For example, the thickness of the shaped part can be reinforced locally to form a boss designed to receive a fastener, for example.

In FIG. 8C, the material deposited (820) during the additive machining operation is reworked by machining to remove material so as to give it locally precise thickness or definite surface qualities.

The performance of all these operations in the same machining phase makes it possible to precisely locate the addition and removal of material in relation to the shape of the surface obtained by shaping, thus making it possible to mass produce parts.

Figure 9:
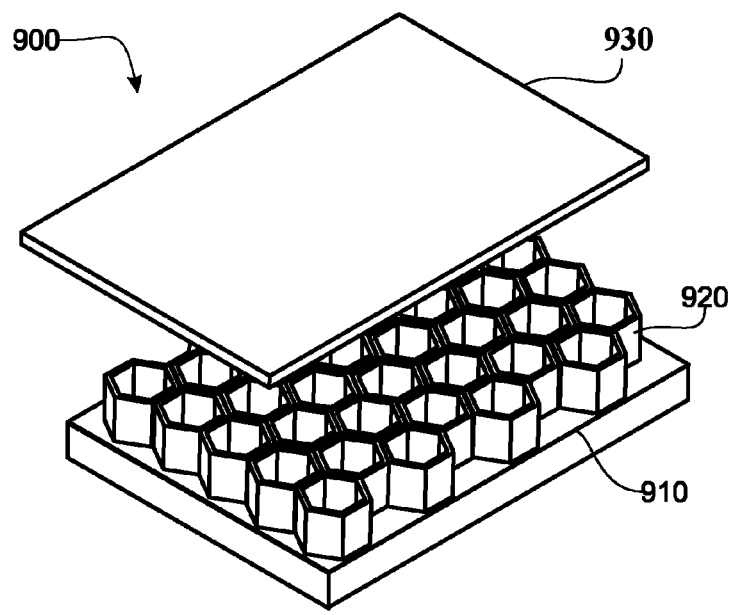
FIG. 9 is a perspective exploded view of an exemplary embodiment of a sandwich part according to the invention.

In FIG. 9, in an exemplary implementation of the method according to the invention, the method is adapted for making a composite sandwich part (900) such as one with what is known as a honeycomb. In one exemplary embodiment, a first substrate (910) is for example machined by removing material so as to give it the desired geometric properties. Stiffeners (920) are deposited by additive machining on the substrate, and if necessary, finished depending on the geometric properties sought. A second substrate (930) is then placed on the top of the stiffeners (920) and welded to them transparently by means of the laser beam of one of the additive machining nozzles. In one exemplary embodiment, stiffeners (not shown) with a shape or direction different from the first stiffeners (920) are placed on the second substrate (930) and a third substrate (not shown) is welded to them and so on in order to make a multi-layered laminate complex.

In one exemplary embodiment, the first substrate (910), the second substrate (930) and the stiffeners (920) are made up of different materials.

The exemplary embodiment of FIG. 9 is presented in the case of a sandwich part (900) that is essentially flat. The method according to the invention is suitable for making a sandwich part with a complex shape, which is possibly non-developable, wherein said complex shape is made by combining all or part of the machining operations involving the removal of material, the addition of material and shaping by plastic deformation.

Figure 10:
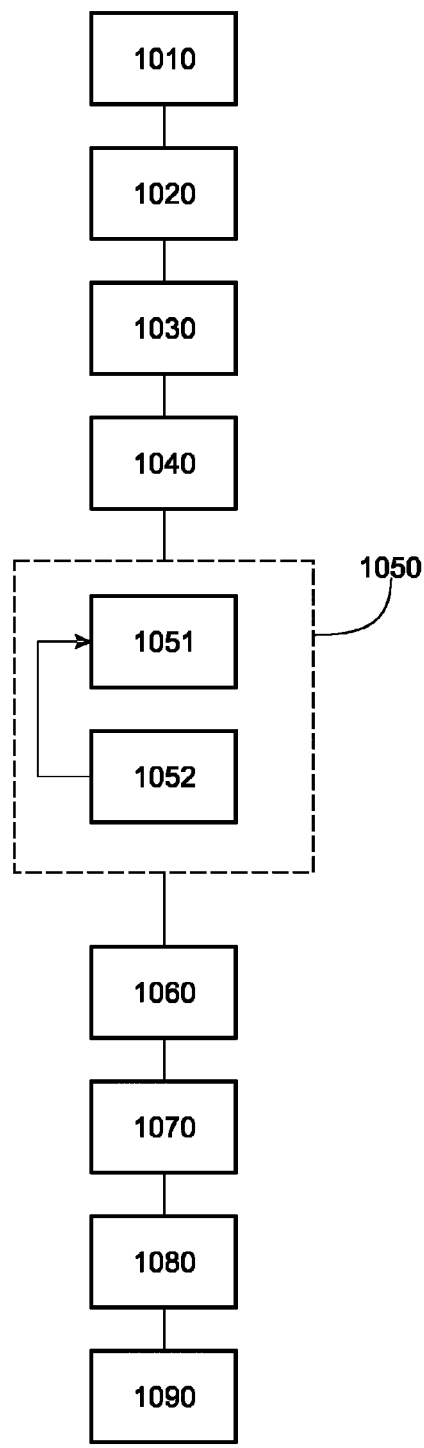
FIG. 10 is a logical diagram of a complex embodiment of the method according to the invention.

In FIG. 10, in a complex exemplary embodiment, the first substrate is positioned (1010) on a die placed on the table of the machine. That first substrate takes the form of a metal sheet, selected for its formability. During a shaping operation (1020), said first substrate is pressed against the die by incremental forming. During a coating operation (1030), a layer of material is deposited on the surface of said substrate by means of additive machining. Thus, the substrate, the thickness of which is increased by the thickness of that layer, is made rigid. During an ablative machining operation (1040), the layer of material deposited during the previous operation is machined to make its thickness even. During an additive machining step (1050), stiffeners, for instance honeycomb stiffeners, are deposited on the surface of said substrate. In one exemplary embodiment, the dimensions of the cells deposited thus is variable from the edges of the substrate to its center. That depositing operation (1050) comprises successive additive machining operations (1051) and ablative machining operations (1052). An ablative machining operation (1060) makes it possible to rework the tops of the cells, so that the top has a surface that is not parallel to the surface of the first substrate. A second substrate in the form of a metal sheet is placed (1070) in the machine and clamped in a blank-holder at the edges. During an incremental shaping operation (1080), said second substrate is pressed against the top of the cells. Finally, during a transparent welding operation (1090), said second substrate is welded to the top of said cells. Thus, the method according to the invention, implemented by means of the device according to the invention, makes it possible to obtain a composite part with a complex shape comprising two non-parallel sides separated by stiffeners with variable stiffening on the surface, without taking the part out of the machine.

The description above and the exemplary embodiments show that the invention achieves the objectives sought. In particular, it makes it possible to automatically make a part by combining machining methods involving the removal, addition and deformation of material, which part is made up of several materials and is made using the same numerical control program, by offering a possibility to readjust the trajectories of each of the machining methods in relation to each other. The invention is particularly suitable for the manufacturing of a composite part comprising internal stiffeners, particularly honeycomb stiffeners.

The invention claimed is:
1. Apparatus for machining a part, comprising:
a single machining head connected to a ram by a fastening interface, and motorized axes comprising a rotary axis configured to displace the machining head in a working space;
a mechanism configured to position and hold the part in position in the working space;
the machining head comprises a support configured to constantly support a spindle, the spindle holding a shaping tool and two supply devices, each supply device being configured to supply a material by projecting a molten metallic powder;
said each supply device comprising a nozzle with an orifice configured to spray a metallic powder, and a laser configured to generate a laser beam coaxial with the orifice of the nozzle and configured to melt the metallic powder as it is sprayed by the nozzle; and
wherein the two supply devices are fitted in the machining head on guides configured to retract the supply device into the machining head when the shaping tool is in use.
2. A method implemented utilizing apparatus according to claim 1, comprising the steps of:
depositing a layer of the material on the part using the supply device during an adding operation;

shaping a section of the part using the material shaping tool during a shaping operation;

wherein the adding and shaping operations are performed in a same machining phase along trajectories that extend in three dimensions of the working space; and wherein the supply device and the material shaping tool are directed normally in relation to the trajectories.

3. The method according to claim 2, wherein the adding operation and the shaping operation are performed successively with a mass of the machining head being substantially constant.

4. The method according to claim 2, wherein the shaping operation is a contour cutting operation performed on the layer of material deposited on the part during an earlier adding operation.

5. The method according to claim 2, wherein the layer deposited during the adding operation is added on a surface of the part that has first undergone shaping.

6. The method according to claim 5, wherein a prior shaping operation is an incremental forming operation.

7. The method according to claim 2, further comprising the steps of performing a part sensing operation by a sensor located on the machining head before a shaping or adding operation, to readjust said operation in the machine space; and measuring a position of the sensor in the working space by a measuring device on the motorized axes.

8. The method according to claim 2, wherein the material shaping tool is a tool for forming the material by plastic deformation; and wherein the shaping operation is an incremental forming operation.

9. The method according to claim 2, wherein a substrate of the part and the material deposited during the adding operation are of different material types.

10. The method according to claim 6, further comprising the step of performing a cutting operation on the layer of the material deposited on the surface that has first been shaped by incremental forming operation.

11. The method according to claim 2, wherein the supply tool comprises a nozzle comprising an orifice for spraying a metal powder, and a device for generating a laser beam coaxial with the orifice of the nozzle and operable to melt the metal powder as it is sprayed; and further comprising the steps of:

placing an added piece on the part that has undergone the adding and shaping operations; and welding the added piece to the part using the laser beam of the machining head.

12. Apparatus according to claim 1, further comprising:
a sensor located on the machining head; and
a measurement device on the motorized axes, the measurement device configured to measure a position of the sensor in the working space.

13. Apparatus according to claim 1, wherein the material shaping tool is a cutting tool.

14. Apparatus according to claim 13, further comprising a platen configured to transmit a cutting motion to the part.

15. Apparatus according to claim 1, wherein the material shaping tool is a forming tool configured to form the material by plastic deformation.

* * * * *